United States Patent
Tran (10) Patent No.: US 7,548,513 B2
(45) Date of Patent: Jun. 16, 2009

(54) TECHNIQUES TO PROVIDE RECOVERY RECEIVE QUEUES FOR FLOODED QUEUES

(75) Inventor: Hieu Trung Tran, Portland, OR (US)

(73) Assignee: Intel Corporation, Santa Clara, CA (US)

(*) Notice: Subject to any disclaimer, the term of this patent is extended or adjusted under 35 U.S.C. 154(b) by 592 days.

(21) Appl. No.: 11/061,997

(22) Filed: Feb. 17, 2005

(65) Prior Publication Data
US 2006/0182031 A1    Aug. 17, 2006

(51) Int. Cl.
*H04L 12/26* (2006.01)
(52) U.S. Cl. .................... 370/235; 370/412
(58) Field of Classification Search ...... 370/229–235.1, 370/236.2, 412, 413
See application file for complete search history.

(56) References Cited

U.S. PATENT DOCUMENTS

| | | | | |
|---|---|---|---|---|
| 5,390,299 A | * | 2/1995 | Rege et al. | 709/234 |
| 5,634,015 A | * | 5/1997 | Chang et al. | 710/310 |
| 5,809,078 A | * | 9/1998 | Tani et al. | 375/259 |
| 6,084,856 A | * | 7/2000 | Simmons et al. | 370/235 |
| 6,678,274 B1 | * | 1/2004 | Walia et al. | 370/395.52 |
| 6,728,212 B1 | * | 4/2004 | Tancevski | 370/235 |
| 7,260,104 B2 | * | 8/2007 | Schmidt | 370/414 |
| 2005/0249228 A1 | * | 11/2005 | Cornett | 370/413 |
| 2006/0004782 A1 | * | 1/2006 | Eldar | 707/100 |
| 2006/0007855 A1 | * | 1/2006 | Tran et al. | 370/229 |
| 2006/0153215 A1 | * | 7/2006 | Cornett et al. | 370/412 |

OTHER PUBLICATIONS

Microsoft Coporation, "Scalable Networking: Eliminating the Receive Processing Bottleneck-Introducing RSS", Microsoft WinHEC 2004 Version, Apr. 14, 2004, pp. 1-17.*

* cited by examiner

*Primary Examiner*—Chirag G Shah
*Assistant Examiner*—Otis L Thompson, Jr.
(74) *Attorney, Agent, or Firm*—Caven & Aghevli LLC (57) ABSTRACT

In a receive-side scaling compatible environment, techniques to provide at least one recovery receive queue for any receive queue that is full or transferring traffic at too slow a rate.

25 Claims, 5 Drawing Sheets

TECHNIQUES TO PROVIDE RECOVERY RECEIVE QUEUES FOR FLOODED QUEUES

FIELD

The subject matter disclosed herein relates to techniques to manage receipt of data from a network.

RELATED ART

Receive-side scaling (RSS) is a feature in an operating system that allows network interfaces that support RSS to direct packets of certain Transmission Control Protocol/Internet Protocol (TCP/IP) flows to be processed on a designated processor among a plurality of processors, thereby increasing packet processing throughput rates in computing platforms that utilize a plurality of processors. The RSS feature scales the received traffic across the plurality of processors in order to avoid limiting the receive bandwidth to the processing capabilities of a single processor. In RSS, a receive queue can be allocated for each of the processors. Each receive queue may store packets for processing by an associated processor.

Some network controllers may use a packet buffer memory space to receive ingress network traffic before determining which receive queue is to receive network traffic and before forwarding ingress network packets to the appropriate receive queues according to RSS parameters. If a processor that processes contents from a receive queue is overloaded by other activities and cannot handle the amount of ingress traffic coming into such receive queue, the receive queue becomes filled up and flooded. When the receive queue is flooded, it is possible that the packet memory buffer has no capacity to store ingress network packets that need to be forwarded to either the flooded receive queue or other receive queues. When the packet memory buffer is flooded, the network interface controller may drop all additional ingress network traffic coming in from the network medium because the lack of space in the onboard packet memory buffer. As a result, ingress network traffic destined to non-flooded receive queues may be dropped. Therefore, other processors in the system may be under-utilized for some time and system performance is degraded.

BRIEF DESCRIPTION OF THE DRAWINGS

Note that use of the same reference numbers in different figures indicates the same or like elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
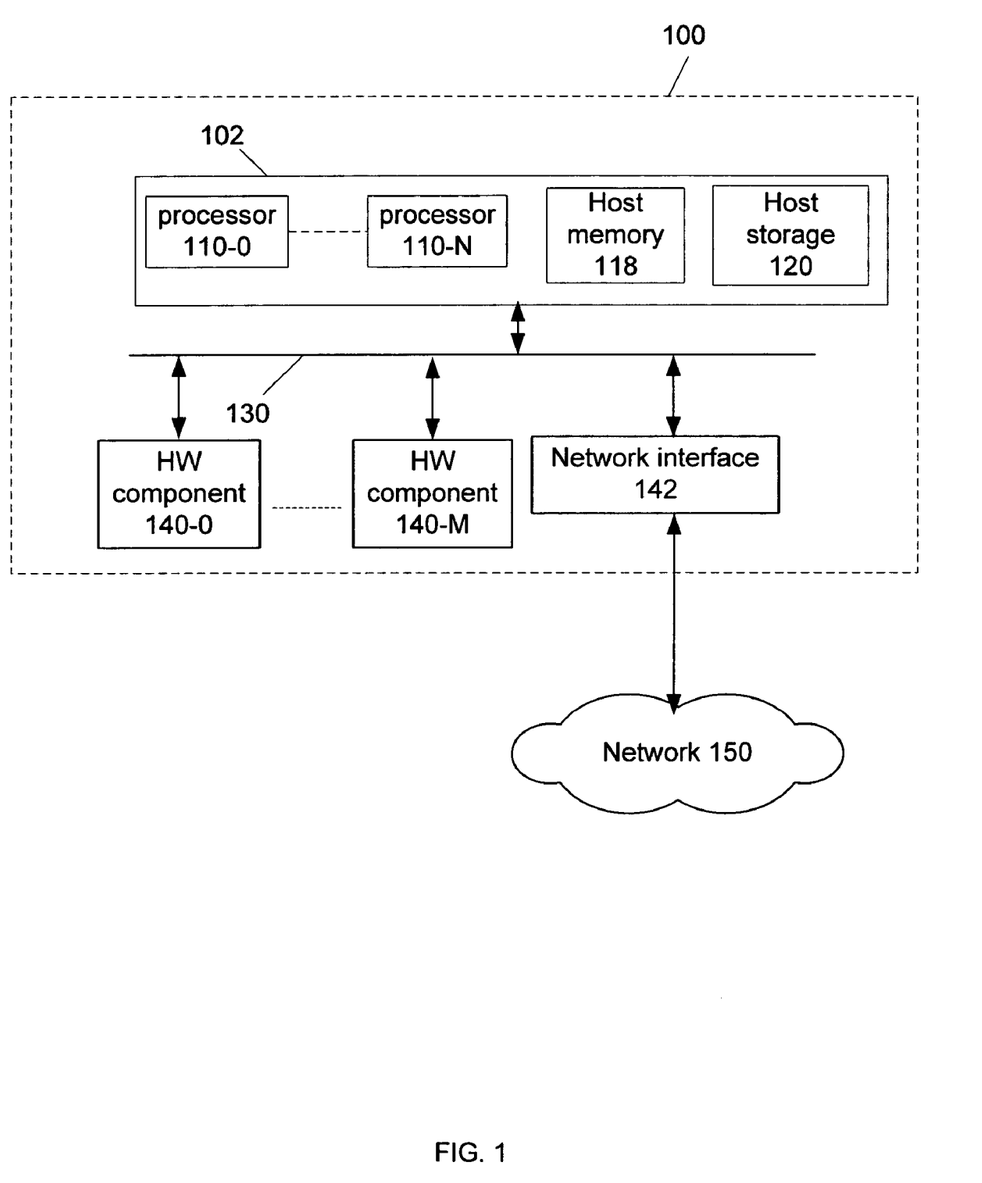
FIG. 1 depicts an example computer system that can use embodiments of the present invention.

FIG. 1 depicts an example computer system 100 that can use embodiments of the present invention. Computer system 100 may include host system 102, bus 130, hardware (HW) components 140-0 to 140-M, and network interface 142. Host system 102 may include multiple central processing units (processors 110-0 to 110-N, where N is $2^z$ and where $z \geq 1$), host memory 118, and host storage 120. Host system 102 may include a chipset to provide intercommunication among the elements of host system 102 as well as with bus 130. Host system 102 may also include a storage controller (not depicted) to control intercommunication with storage 120 and a graphics adapter (not depicted) that can be used for transmission of graphics and information for display on a display device (not depicted). For example, the storage controller may provide intercommunication with host storage 120 using any of the following protocols: Small Computer Systems Interface (SCSI), Fibre Channel (FC), and/or Serial Advanced Technology Attachment (S-ATA).

Any of processors 110-0 to 110-N may be implemented as a Complex Instruction Set Computer (CISC) or Reduced Instruction Set Computer (RISC) processors, multi-core, or any other microprocessor or central processing unit.

Host memory 118 may be implemented as a volatile memory device such as but not limited to a Random Access Memory (RAM), Dynamic Random Access Memory (DRAM), or Static RAM (SRAM).

Host storage 120 may be implemented as a non-volatile storage device such as but not limited to a magnetic disk drive, optical disk drive, tape drive, an internal storage device, an attached storage device, and/or a network accessible storage device. Applications and information from host storage 120 may be loaded into host memory 118 and executed by the one or more processors.

Bus 130 may provide intercommunication among host system 102, HW components 140-0 to 140-M, and network interface 142. Bus 130 may support serial or parallel communications. Bus 130 may support node-to-node or node-to-multi-node communications. Bus 130 may be compatible with Peripheral Component Interconnect (PCI) described for example at Peripheral Component Interconnect (PCI) Local Bus Specification, Revision 2.2, Dec. 18, 1998 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.0a, Jul. 24, 2000, available from the aforesaid PCI Special Interest Group, Portland, Oreg., U.S.A. (as well as revisions thereof); and/or Universal Serial Bus (USB) (and related standards) as well as other interconnection standards.

Each of HW components 140-0 to 140-M may be any device capable of receiving information from host system 102 or providing information to host system 102. HW components 140-0 to 140-M can be integrated into the same computer platform as that of host system 102. HW components 140-0 to 140-M may intercommunicate with host system 102 using bus 130.

Computer system 100 may utilize network interface 142 to receive information from network 150 and transfer information to network 150. Network interface 142 may be capable of supporting receive-side scaling (RSS) utilization of multiple processors in host system. Network 150 may be any network such as the Internet, an intranet, a local area network (LAN), storage area network (SAN), a wide area network (WAN), or wireless network. Network 150 may exchange traffic with network interface 142 using the Ethernet standard (described in IEEE 802.3 and related standards) or any communications standard.

In accordance with an embodiment of the present invention, computer system 100 may provide routing of packets received through network interface 142 to one or more recovery receive queue instead of to a flooded receive queue.

Computer system 100 may be implemented as any or a combination of: microchips or integrated circuits interconnected using conductive leads of a motherboard, hardwired logic, software stored by a memory device and executed by a microprocessor, firmware, an application specific integrated circuit (ASIC), and/or a field programmable gate array (FPGA).

Figure 2:
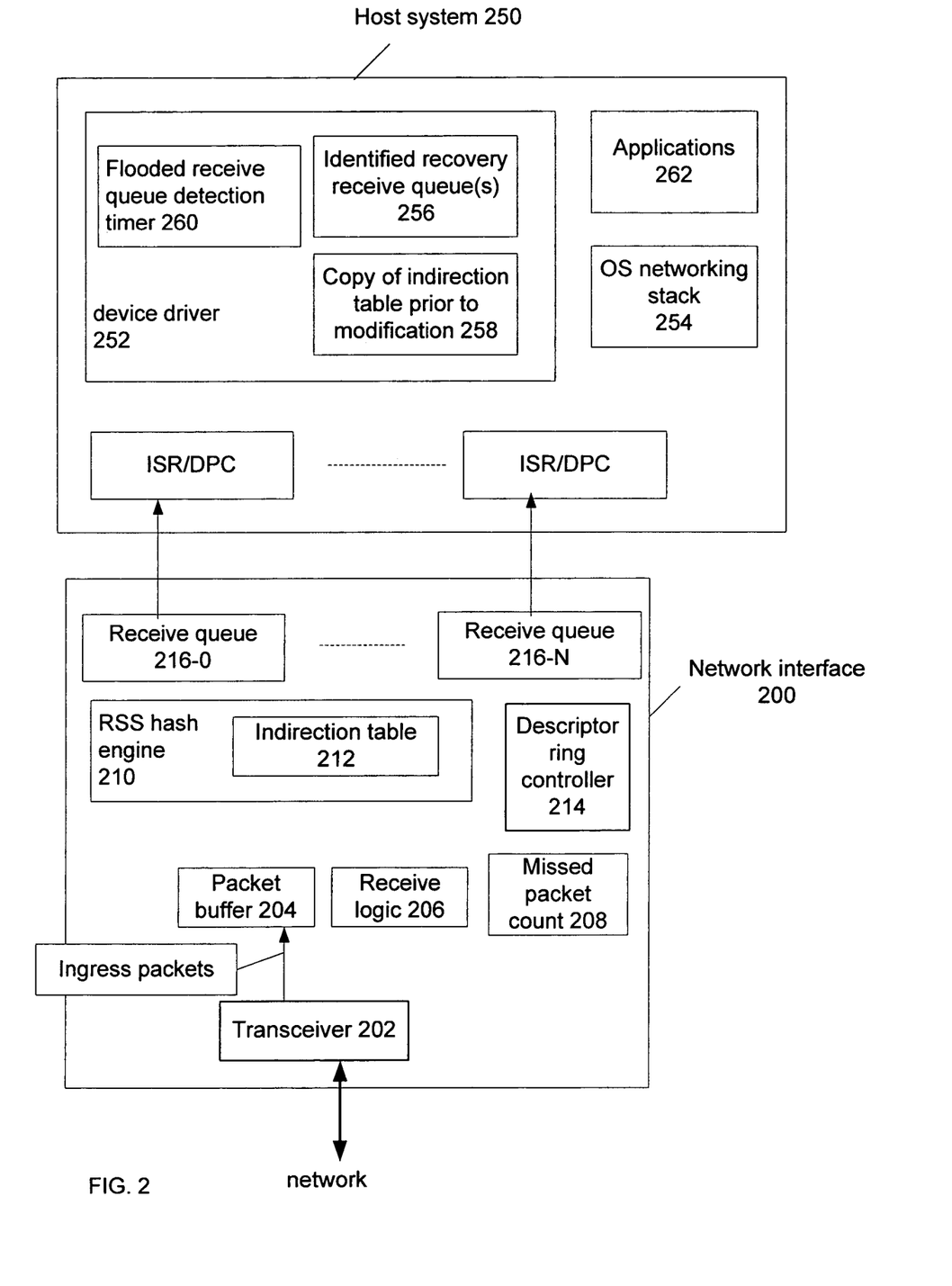
FIG. 2 illustrates elements that can be used in an embodiment of the present invention to route packets received from a network interface controller to a recovery receive queue instead of to a flooded receive queue.

FIG. 2 illustrates an embodiment of the present invention that can be used to route packets received from a network interface to one or more recovery receive queue instead of to a flooded receive queue. When a receive queue is flooded, the packet buffer may be filled up due to holding ingress packets destined to the flooded receive queue. A filled packet buffer may drop received packets. A filled packet buffer may not receive additional ingress packets and non-flooded receive queues may not receive additional ingress packets. Some embodiments of the present invention provide for recovery receive queue(s) to receive packets intended for flooded receive queue(s).

For example, network interface 200 may include transceiver 202, packet buffer 204, receive logic 206, missed packet count 208, RSS hash engine 210 (with indirection table 212), descriptor ring controller 214, and receive queues 216-0 to 216-N.

Transceiver 202 may include a media access controller (MAC) and a physical layer interface (both not depicted) capable of receiving packets from a network and transmitting packets to a network in conformance with the applicable protocols such as Ethernet as described in IEEE 802.3, although other protocols may be used. Transceiver 202 may receive and transmit packets from and to a network via a network medium. Transceiver 202 may forward packets received from a network to packet buffer 204.

Receive logic 206 may determine whether packet buffer 204 has enough storage capacity to store a received ingress packet and whether packet buffer 204 is to store the received ingress packet. If packet buffer 204 has enough storage capacity to store the received ingress packet, receive logic 206 instructs packet buffer 204 to store the received ingress packet. If packet buffer 204 does not have enough storage capacity to store the received ingress packet, receive logic 206 instructs packet buffer 204 to drop the packet and receive logic 206 increments the count of missed packet count 208 by one for every dropped packet. Missed packet count 208 maintains a count of the number of ingress packets dropped by receive logic 206 at least because of lack of capacity to receive the packets into packet buffer 204. For example, packet buffer 204 may transfer packets to receive queues in a first-in-first-out manner, although other schemes may be used.

RSS hash engine 210 computes an RSS hash value for each ingress network packet using operating system configured RSS parameters and selected fields from the packet (e.g., IP source address, IP destination address, TCP source port number, and TCP destination port number). A hash value may be used in conjunction with the RSS indirection table and configured by device driver 252 and OS networking stack 254, for example, to identify the processor on which a packet should be processed. The network interface may store the computed RSS hash value into one or more receive descriptors into a receive descriptor ring for transfer.

Indirection table 212 may be used to determine which receive queue among receive queues 216-0 to 216-N an ingress packet from packet buffer 204 is to be forwarded to, where N is $2^z$ and $z \geq 1$. Indirection table 212 may store associations between hash values and receive queues among receive queues 216-0 to 216-N. In accordance with an embodiment of the present invention, indirection table 212 can be modified in such a way that all ingress network packets destined to a flooded receive queue are routed instead to one or more recovery receive queues. A flooded receive queue may be any receive queue that is full or transferring packets at too slow a pace. A recovery receive queue may be a receive queue among receive queues 216-0 to 216-N that is not considered flooded.

Each of receive queues 216-0 to 216-N may be associated with a different processor. Packets associated with each receive queue may be processed by a processor in the host system via an interrupt service routine (ISR) or a Deferred Procedure Call (DPC). In response to the ISR or DPC, the associated processor may execute an OS networking stack 254 to process ingress packets.

Descriptor ring controller 214 may manage use of receive descriptor rings (not depicted). For example, descriptors may be provided by host system to the network interface. A receive descriptor ring may be utilized by each of the receive queues to transfer descriptors describing either the whole or a part of an ingress network packet and the packet's properties including but not limited to the resulting RSS hash value for the packet. In one embodiment, each receive descriptor ring may be a circular queue and may have head and tail offset registers indicating the current positions of the head and tail of the circular queue or ring.

A bus interface (not depicted) may provide intercommunication between network interface 200 and a bus that may provide intercommunication between network interface 200 and host system 250 (including but not limited to a bus similar to bus 130 (FIG. 1)). The bus interface may comply with standards supported by bus 130 (although other interconnection standards may be used). For example, the bus interface may include and utilize a direct memory access (DMA) engine to perform direct memory accesses from and into host memory and/or host storage of a host system.

Device driver 252 may be a device driver for network interface 200. Device driver 252 may create descriptors and may manage the use and allocation of descriptors. In addition, device driver 252 may interact with the OS networking stack 254 and manage network interface 200 to perform network transmission-related operations (e.g. transmit and receive) in accordance with applicable protocols. Device driver 252 may request that descriptors be transferred to the network interface using a descriptor ring. Device driver 252 may inform OS networking stack 254 of the availability and location of ingress packets.

Device driver 252 may periodically determine whether network interface 200 is to enter a recovery mode. The recovery mode may be a mode when one of the receive queues is flooded and packets intended to be routed to the flooded receive queue are instead routed to a recovery receive queue. Device driver 252 may determine whether to enter a recovery mode every time a flooded receive queue detection timer 260 expires. After each expiration of the flooded receive queue detection timer 260, device driver 252 reads the value of missed packet count 208. If the latest value of missed packet count 208 does not pass a predefined threshold, network interface 200 is determined to be not blocked from receiving additional ingress network traffic from a network medium. If the latest missed packet count passes the predefined threshold, network interface 200 is determined to be either currently blocked from receiving additional ingress network traffic from a network medium or is receiving additional ingress network traffic from a network medium at too slow a rate.

If network interface 200 is determined to be currently blocked or receiving traffic at too slow a rate, device driver 252 may determine which receive queue(s) is/are flooded. The blocking condition may be caused by one or more flooded receive queues. A receive queue may be considered flooded if all of descriptors in the associated receive descriptor ring have been used up by the network interface controller. A receive queue may also be considered flooded if coming in and out of the blocking condition (i.e., cannot transfer packets at a fast enough rate). If device driver 252 determines that one or more receive queue is/are flooded (in addition to the missed packet count indicating the network interface controller is blocking by dropping packets), it enters the recovery mode to recover the network interface controller from the blocking condition.

In recovery mode, device driver 252 selects one or more recovery receive queues from non-flooded receive queues among receive queues 260-0 to 260-N. After identifying one or more recovery receive queue, device driver 252 copies the existing indirection table 212 (shown as copy of indirection table prior to modification 258), and modifies indirection table 212 in such a way that all ingress network packets destined to the flooded receive queues are routed to one or more recovery receive queue. Accordingly, congestion in packet buffer 204 caused by one or more flooded receive queue may be relieved so packet buffer 204 can receive additional ingress network traffic from the network medium. The copied indirection table 258 may be used to restore indirection table 212 after device driver 252 exits recovery mode.

Device driver 252 may determine whether to transfer an ingress packet from the recovery receive queue for processing by OS networking protocol stack 254 or other processing. In one embodiment, if the ready-to-transfer ingress packet is actually destined to one of the flooded receive queues but is stored in the recovery receive queue, it is dropped. Otherwise, device driver 252 may transfer the ready-to-transfer packet for processing by OS networking protocol 254 or other processing. For example, device driver 252 may use the hash value of the ready-to-transfer packet and the copy of the indirection table 258 to determine whether the packet in the recovery receive queue is actually destined to one of the flooded receive queues.

OS networking stack 254 may be any operating system that supports receive-side scaling (RSS) such as Microsoft Windows® or UNIX. OS networking stack 254 may also provide protocol processing for packets received from a network. For example, OS networking stack 254 may process packets to determine TCP/IP compliance in accordance with relevant TCP/IP standards. The TCP/IP protocol is described in the publication entitled "Transmission Control Protocol: DARPA Internet Program Protocol Specification," prepared for the Defense Advanced Projects Research Agency (RFC 793, published September 1981). OS networking stack 254 may be executed by any or all of, for example, processors 110-0 to 110-N (of FIG. 1).

Applications 262 may request data transfer to a network or receive data derived from protocol processed packets from OS networking stack 254. Examples of applications 262 include, but are not limited to, a web browser, SQL server, file server, or a data base.

The system of FIG. 2 may be implemented as any or a combination of: microchips or integrated circuits interconnected using conductive leads of a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Figure 3:
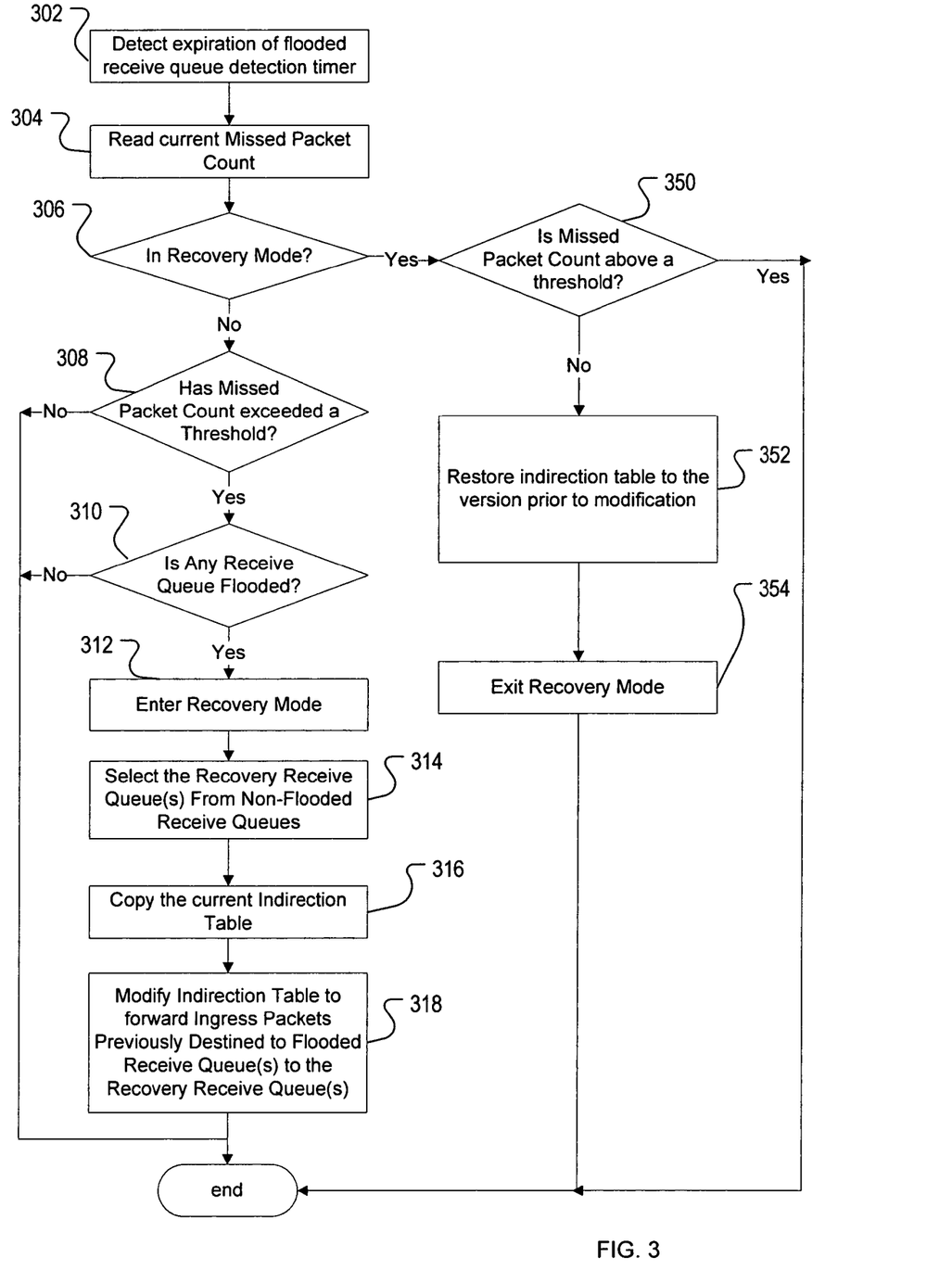
FIG. 3 depicts an example process that can be used in embodiments of the present invention to provide recovery receive queue(s) to relieve blocking conditions in a network interface controller.

FIG. 3 depicts an example process that can be used in embodiments of the present invention by a device driver (such as but not limited to device driver 252) to provide recovery receive queue(s) to relieve blocking conditions in a network interface controller. In block 302, the device driver may detect that a flooded receive queue detection timer expires.

In block 304, the device driver may read the current missed packet count. Missed packet count may maintain a count of the number of ingress packets dropped by a packet buffer of the network interface because of lack of capacity to receive the packets.

In block 306, the device driver may determine whether the network interface (such as but not limited to network interface 200) is in recovery mode. If the network interface is not in recovery mode, block 308 follows. If the network interface is in recovery mode, block 350 follows.

In block 308, the device driver may determine whether the missed packet count exceeds a predetermined threshold. If the missed packet count exceeds a predetermined threshold, then block 310 follows block 308. If the missed packet count does not exceed the predetermined threshold, then the process ends. For example, the predetermined threshold may vary based on the duration of the flooded receive queue detection timer (e.g., the lower the duration of the flooded receive queue detection timer, the lower the value of the predetermined threshold). For example, the value of the predetermined threshold may vary depending on the network interface speed (10 Mega bits per second (Mbps), 100 Mbps, 1000 Mbps, etc.).

In block 310, the device driver may determine whether any receive queue is flooded. A receive queue may be considered flooded if full or transferring packets at too slow a pace. For example, head and tail pointers associated with each receive queue may be examined to determined fullness. For example, a receive queue may be considered full if the head and tail pointers approximately point to the same location. For example, the receive queue may be considered as transferring packets at too slow a rate if the tail pointer has not moved a sufficient number of descriptors since the expiration of the previous flooded receive queue detection timer and the difference between head and tail in terms of descriptors is too large. If any receive queue is flooded, block 312 follows. If no receive queue is flooded, the process ends.

In block 312, the device driver may enter the recovery mode. In block 314, the device driver may select one or more recovery receive queues from non-flooded receive queues. In block 316, the device driver may retain a copy of the current version of the indirection table. An indirection table may be configured to and used by the network interface to determine which receive queue an ingress packet is to be forwarded to. In block 318, the device driver may modify the current indirection table to forward ingress packets destined to flooded receive queue(s) instead to the recovery receive queue(s). In one embodiment, one or more flooded receive queue may be identified and one or more recovery receive queues provided to receive packets that would otherwise be routed to the flooded receive queue(s). The process of FIG. 3 thereafter ends.

In block 350, the device driver may determine whether the missed packet count exceeds a predetermined threshold. The predetermined threshold may be the same value used in block 308. If the missed packet count exceeds the predetermined threshold, the process ends. If the missed packet count does not exceed the predetermined threshold, block 352 follows block 350. In block 352, the device driver may restore the indirection table to the version prior to modification to route packets from flooded queue(s) instead to recovery queue(s). The prior version may have been previously stored in an execution of block 316. In block 354, the device driver may exit the recovery mode and the process of FIG. 3 thereafter ends.

Figure 4:
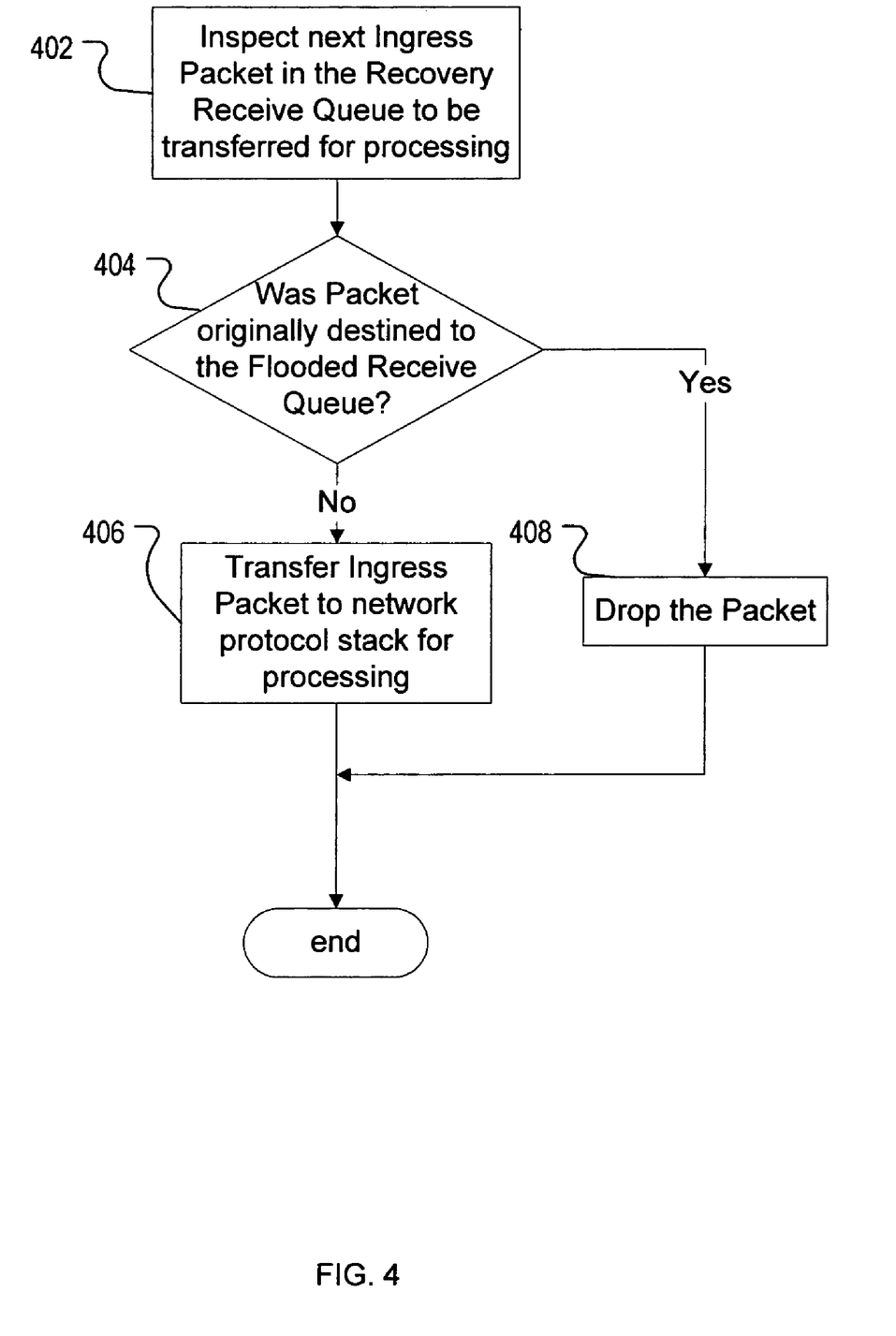
FIG. 4 depicts an example process that can be used in embodiments of the present invention to determine whether to transfer a packet from a recovery receive queue for network protocol processing or other processing.

FIG. 4 depicts an example process that can be used in embodiments of the present invention to determine whether to transfer a packet from a recovery receive queue for network protocol processing or other processing. In block 402, the device driver may inspect the next ingress packet in the recovery receive queue available to be transferred for processing. In block 404, the device driver may determine whether the packet originally was to be routed to a flooded receive queue. For example, the device driver may determine the original routing of the packet by inspecting the copy of the indirection table prior to modification and the hash value computed for the packet to determine whether packet was to be routed to the flooded receive queue. If the packet was not destined to the flooded receive queue, then block 406 may follow block 404. If the packet was destined to the flooded receive queue, then block 408 may follow block 404.

In block 406, the device driver may permit the recovery receive queue to transfer the packet for network protocol processing. For example, to transfer the ingress packet may include forwarding the packet to the OS networking stack 254 for processing. In block 408, the device driver may instruct the recovery receive queue to drop the ingress packet rather than transferring the packet for processing.

In one embodiment, instead of dropping packets originally destined to the flooded queue but stored in the recovery receive queue, some or all of such packets could be transferred to the flooded queue after the flooded queue is determined not to be flooded so that the packets can be available to be processed. In another embodiment, such packets can be queued in a virtual queue to be processed right after the received packets currently in the flooded receive queue are processed.

Figure 5:
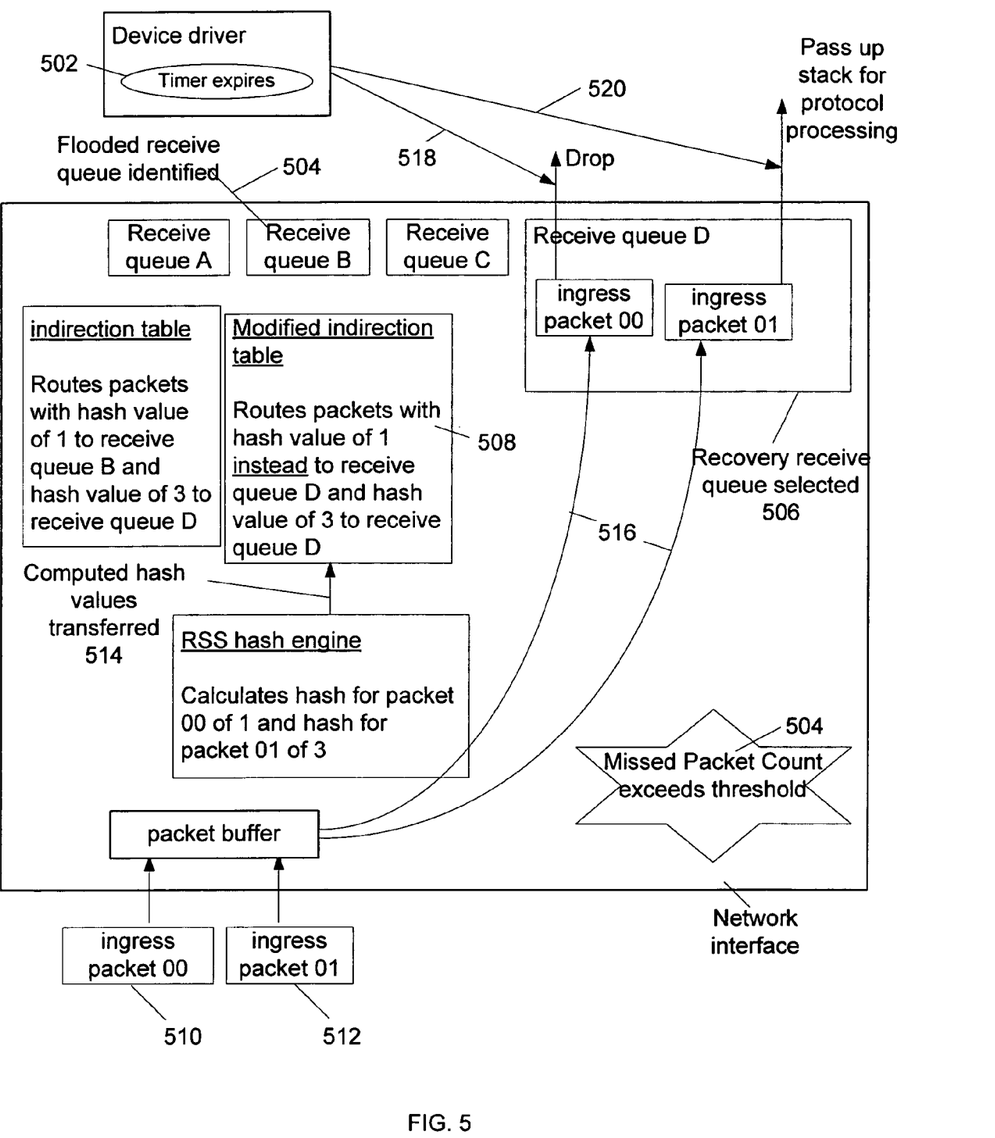
FIG. 5 depicts an example operation, in accordance with an embodiment of the present invention.

FIG. 5 depicts an example operation, in accordance with an embodiment of the present invention. At 502, a flooded receive queue detection timer monitored by the device driver expires. Within 504, the device driver determines that the missed packet count exceeds a predetermined threshold, detects a flooded queue, and enters recovery mode.

At 506, the device driver determines a recovery queue for the flooded queue among the receive queues. At 508, the device driver stores the indirection table and then modifies the indirection table to route packets from the flooded queue instead to the recovery queue.

At 510 and 512, the network interface receives respective packets 00 and 01. At 514, the hash values computed by the hash calculator for each of packets 00 and 01 are passed up to the modified indirection table. At 516, the modified indirection table routes packet 00 to the recovery receive queue instead of originally intended flooded receive queue and routes packet 01 to the originally directed receive queue.

Before transferring any packet from recovery receive queue to an OS networking stack for protocol processing, the device driver determines whether the packet was originally to be transferred to the flooded queue. At 518, packet 00 is dropped from the recovery receive queue because it was originally to be routed to the flooded queue whereas at 520, packet 01 is forwarded for processing because it was originally to be routed to the receive queue designated as a recovery receive queue.

The drawings and the forgoing description gave examples of the present invention. Although depicted as a number of disparate functional items, those skilled in the art will appreciate that one or more of such elements may well be combined into single functional entities. Alternatively, certain elements may be split into multiple functional elements. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   selectively identifying at least one flooded receive queue among multiple receive queues in response to a determination that more than a predefined number of ingress packets have been dropped instead of stored in a packet buffer, wherein the packet buffer is capable of receiving packets from a network medium;
   selectively modifying an indirection table to route ingress packets destined to the at least one flooded receive queue to at least one non-flooded recovery receive queue;
   selectively transferring an ingress packet to a non-flooded recovery receive queue based in part on the modified indirection table; and
   selectively dropping the transferred ingress packet from the non-flooded recovery receive queue in response to a determination that the ingress packet was originally to be routed to the flooded receive queue.

2. The method of claim 1, wherein the selectively identifying at least one flooded receive queue further comprises selectively identifying at least one flooded receive queue in response to expiration of a flooded receive queue detection timer.

3. The method of claim 1, wherein the receive queues are utilized in a receive-side scaling environment.

4. The method of claim 1, further comprising storing the indirection table prior to selectively modifying the indirection table.

5. The method of claim 1, wherein the determination that the ingress packet was originally to be routed to the flooded receive queue comprises determining the routing of the ingress packet using the indirection table prior to modification.

6. The method of claim 1, further comprising:
   selectively transferring an ingress packet to a non-flooded recovery receive queue based in part on the modified indirection table; and
   selectively forwarding the transferred ingress packet from the non-flooded recovery receive queue for processing in response to a determination that the ingress packet was originally to be routed to the non-flooded recovery receive queue.

7. The method of claim 6, wherein the processing comprises TCP/IP stack processing.

8. The method of claim 1, further comprising:
selectively modifying the indirection table to route ingress packets to the at least one flooded receive queue in response to the at least one flooded receive queue being identified as not flooded.

9. An apparatus comprising:
a packet buffer to store ingress packets from a network medium;
multiple receive queues;
a hash calculator to determine a hash value associated with each of the ingress packets provided from the packet buffer;
an indirection table to identify a receive queue among the multiple receive queues in which to store an ingress packet based at least on an associated hash value;
logic to selectively determine if any of the multiple receive queues are flooded in response to the packet buffer dropping more than a predetermined amount of ingress packets;
logic to selectively modify the indirection table to route packets to at least one non-flooded recovery receive queue among the multiple receive queues in response to a receive queue determined as flooded; and
logic to selectively transfer an ingress packet to a non-flooded recovery receive queue based in part on the modified indirection table and logic to selectively drop the ingress packet from the non-flooded recovery queue in response to a determination that the ingress packet was originally to be routed to the flooded receive queue.

10. The apparatus of claim 9, wherein the logic to selectively determine if any of the multiple receive queues are flooded is to selectively determine if any of the multiple receive queues are flooded in response to expiration of a flooded receive queue detection timer.

11. The apparatus of claim 9, wherein the receive queues are utilized in a receive-side scaling environment.

12. The apparatus of claim 9, wherein the logic is to store the indirection table prior to selectively modifying the indirection table.

13. The apparatus of claim 9, further comprising logic to selectively transfer an ingress packet to a non-flooded recovery receive queue based in part on the modified indirection table and logic to selectively forward the ingress packet from the non-flooded recovery queue for processing in response to a determination that the ingress packet was originally to be routed to the non-flooded recovery queue.

14. The apparatus of claim 13, wherein the processing comprises TCP/IP stack processing.

15. The apparatus of claim 9, wherein the logic to selectively modify is to modify the indirection table to route ingress packets to the at least one flooded receive queue in response to the at least one flooded receive queue being identified as not flooded.

16. A computer-readable medium comprising instructions stored thereon which when executed by a machine cause the machine to:
selectively identify at least one flooded receive queue among multiple receive queues in response to a determination that more than a predefined number of ingress packets have been dropped by a packet buffer, wherein the packet buffer is capable of receiving packets from a network medium;

selectively modify an indirection table to route ingress packets destined to the at least one flooded receive queue to at least one non-flooded recovery receive queue;
selectively transfer an ingress packet to a non-flooded recovery receive queue based in part on the modified indirection table; and
selectively drop the transferred ingress packet from the non-flooded recovery receive queue in response to a determination that the ingress packet was originally to be routed to the flooded receive queue.

17. The computer-readable medium of claim 16, wherein the receive queues are utilized in a receive-side scaling environment.

18. The computer-readable medium of claim 16, further comprising instructions which when executed by a machine cause the machine to:
store the indirection table prior to selectively modifying the indirection table.

19. The computer-readable medium of claim 16, further comprising instructions which when executed by a machine cause the machine to:
selectively transfer an ingress packet to a non-flooded recovery receive queue based in part on the modified indirection table; and
selectively forward the transferred ingress packet from the non-flooded recovery receive queue for processing in response to a determination that the ingress packet was originally to be routed to the non-flooded recovery receive queue.

20. The computer-readable medium of claim 19, wherein the processing comprises TCP/IP stack processing.

21. The computer-readable medium of claim 19, wherein the instruction which when executed by a machine cause the machine to selectively modify an indirection table is further to:
selectively modify the indirection table to route ingress packets to the at least one flooded receive queue in response to the at least one flooded receive queue being identified as not flooded.

22. A system comprising:
a host system comprising a plurality of processors and a memory device;
a parallel bus;
a chipset to communicatively couple the host system to the parallel bus;
a network interface communicatively coupled to the parallel bus and comprising:
a packet buffer to store ingress packets from a network medium, multiple receive queues,
a hash calculator to determine a hash value associated with each of the ingress packets provided from the packet buffer,
an indirection table to identify a receive queue among the multiple receive queues in which to store an ingress packet based at least on an associated hash value,
logic to selectively determine if any of the multiple receive queues are flooded in response to the packet buffer dropping more than a predetermined amount of ingress packets, and
logic to selectively modify the indirection table to route packets to at least one non-flooded recovery receive queue among the multiple receive queues in response to a receive queue determined as flooded,
wherein the network interface further comprises logic to selectively transfer an ingress packet to a non-flooded recovery receive queue based in part on the modified indirection table and logic to selectively drop the ingress packet from the non-flooded recovery queue in response to a determination that the ingress packet was originally to be routed to the flooded receive queue.

23. The system of claim 22, wherein the network interface further comprises logic to selectively transfer an ingress packet to a non-flooded recovery receive queue based in part on the modified indirection table and logic to selectively forward the ingress packet from the non-flooded recovery queue for processing in response to a determination that the ingress packet was originally to be routed to the non-flooded recovery queue.

24. The system of claim 22, wherein the bus is compatible with PCI.

25. The system of claim 22, wherein the bus is compatible with PCI express.

* * * * *